US010267401B2

(12) United States Patent  
Valente et al.

(10) Patent No.: US 10,267,401 B2  
(45) Date of Patent: Apr. 23, 2019

(54) AXLE ASSEMBLY

(71) Applicant: American Axle & Manufacturing, Inc., Detroit, MI (US)

(72) Inventors: Paul J. Valente, Berkley, MI (US); James P. Downs, South Lyon, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 220 days.

(21) Appl. No.: 15/358,163

(22) Filed: Nov. 22, 2016

(65) Prior Publication Data

US 2017/0146108 A1 May 25, 2017

Related U.S. Application Data

(60) Provisional application No. 62/313,212, filed on Mar. 25, 2016, provisional application No. 62/259,679, filed on Nov. 25, 2015.

(51) Int. Cl.  
 *F16H 48/22* (2006.01)  
 *F16D 13/52* (2006.01)  
 (Continued)

(52) U.S. Cl.  
 CPC ............. *F16H 48/36* (2013.01); *F16D 13/52* (2013.01); *F16D 13/70* (2013.01); *F16D 13/76* (2013.01); *F16D 25/082* (2013.01); *F16D 25/10* (2013.01); *F16D 25/123* (2013.01); *F16H 57/031* (2013.01); *F16H 57/037* (2013.01);  
 (Continued)

(58) Field of Classification Search  
 CPC ...... F16H 48/36; F16H 57/037; F16H 57/031; F16H 48/32; F16H 48/22; F16H 48/10; F16H 2048/366; F16H 48/40; F16D 25/10; F16D 25/082; F16D 13/76; F16D 25/123; F16D 13/52; F16D 13/70; B60Y 2400/802; B60Y 2400/804  
 See application file for complete search history.

(56) References Cited

U.S. PATENT DOCUMENTS

| | | |
|---|---|---|
| 696,704 A | 4/1902 | Allen |
| 783,168 A | 2/1905 | Baker |
| (Continued) | | |

FOREIGN PATENT DOCUMENTS

| | | |
|---|---|---|
| CN | 201334012 Y | 10/2009 |
| DE | 01627594 A1 | 8/1970 |
| (Continued) | | |

OTHER PUBLICATIONS

European International Search Report dated Apr. 7, 2017 for corresponding International application PCT/US2016/063571, filed Nov. 23, 2016.

(Continued)

*Primary Examiner* — Jacob S. Scott  
*Assistant Examiner* — Lillian T Nguyen  
(74) *Attorney, Agent, or Firm* — Harness, Dickey & Pierce, P.L.C.

(57) ABSTRACT

A family of axle assemblies that employ a modular concept to maximize part commonality amongst the several axle assemblies. The axle assemblies have a housing assembly that employs a main housing that is formed from a casting that is common to all of the axle assemblies.

13 Claims, 7 Drawing Sheets

(51) Int. Cl.
*F16H 48/36* (2012.01)
*F16D 13/70* (2006.01)
*F16H 57/031* (2012.01)
*F16H 57/037* (2012.01)
*F16H 13/76* (2006.01)
*F16D 25/08* (2006.01)
*F16D 25/10* (2006.01)
*F16D 25/12* (2006.01)
*F16H 48/10* (2012.01)
*F16H 48/40* (2012.01)
*F16H 48/32* (2012.01)

(52) U.S. Cl.
CPC ... *B60Y 2400/802* (2013.01); *B60Y 2400/804* (2013.01); *F16H 48/10* (2013.01); *F16H 48/22* (2013.01); *F16H 48/32* (2013.01); *F16H 48/40* (2013.01); *F16H 2048/366* (2013.01)

(56) References Cited

U.S. PATENT DOCUMENTS

| | | |
|---|---|---|
| 899,891 A | 9/1908 | Niclausse |
| 1,987,716 A | 1/1935 | Skelton |
| 2,187,614 A | 1/1940 | Ormsby |
| 2,548,258 A | 4/1951 | Griffith |
| 2,609,710 A | 9/1952 | Osborn |
| 2,882,752 A | 4/1959 | Russell |
| 3,115,048 A | 12/1963 | Cape |
| 3,344,687 A | 10/1967 | Stockton |
| 3,385,133 A | 5/1968 | Terao |
| 3,394,610 A | 7/1968 | Szodfridt |
| 3,777,360 A | 12/1973 | Welch |
| 3,792,625 A | 2/1974 | Asberg |
| 4,004,472 A | 1/1977 | Millward et al. |
| 4,103,567 A | 8/1978 | Franco et al. |
| 4,182,201 A | 1/1980 | Mayhew et al. |
| 4,754,847 A | 7/1988 | Glaze et al. |
| 5,098,355 A | 3/1992 | Long |
| 5,203,750 A | 4/1993 | Oster et al. |
| 5,503,494 A | 4/1996 | Kamata et al. |
| 5,520,589 A | 5/1996 | Dewald et al. |
| 5,560,687 A | 10/1996 | Hagelthorn |
| 5,865,701 A | 2/1999 | Sowa et al. |
| 5,913,745 A | 6/1999 | Inagaki et al. |
| 6,056,663 A | 5/2000 | Fett |
| 6,077,183 A | 6/2000 | Tar et al. |
| 6,283,884 B1 | 9/2001 | El-Kassouf |
| 6,540,634 B2 | 4/2003 | Thompson |
| 6,544,140 B2 | 4/2003 | Gradu et al. |
| 6,582,334 B1 | 6/2003 | Noll |
| 6,616,565 B1 | 9/2003 | Chen et al. |
| 6,623,396 B2 | 9/2003 | Szalony et al. |
| 6,645,113 B2 | 11/2003 | Orr et al. |
| 6,652,408 B2 | 11/2003 | Rutt et al. |
| 6,695,739 B2 | 2/2004 | Fett |
| 6,699,154 B2 | 3/2004 | Orr et al. |
| 6,702,707 B2 | 3/2004 | Krzesicki et al. |
| 6,719,661 B2 | 4/2004 | Turner et al. |
| 6,824,489 B2 | 11/2004 | Jacob et al. |
| 6,863,634 B2 | 3/2005 | Holman et al. |
| 6,863,684 B2 | 3/2005 | Kim et al. |
| 6,896,463 B2 | 5/2005 | Tuthill |
| 7,022,041 B2 | 4/2006 | Valente |
| 7,086,983 B2 | 8/2006 | Turner et al. |
| 7,155,824 B2 | 1/2007 | Prucher |
| 7,188,699 B2 | 3/2007 | Moore et al. |
| 7,232,399 B2 | 6/2007 | Valente |
| 7,314,416 B2 | 1/2008 | Loughrin et al. |
| 7,393,301 B2 | 7/2008 | Green, Jr. |
| 7,500,934 B2 | 3/2009 | Ziech |
| 7,520,833 B2 | 4/2009 | Honda et al. |
| 7,775,928 B2 | 8/2010 | Zink |
| 7,901,318 B2 | 3/2011 | Downs et al. |
| 7,984,782 B2 * | 7/2011 | Platt .................. B60K 17/16 180/217 |
| 8,167,758 B2 | 5/2012 | Downs et al. |
| 8,469,854 B1 | 6/2013 | Downs et al. |
| 8,616,780 B2 | 12/2013 | Kwasniewski et al. |
| 8,795,126 B2 | 8/2014 | Downs et al. |
| 8,951,159 B2 | 2/2015 | Fox et al. |
| 8,986,148 B2 | 3/2015 | Downs et al. |
| 8,986,151 B2 | 3/2015 | Valente et al. |
| 9,028,358 B2 | 5/2015 | Valente et al. |
| 9,062,744 B2 | 6/2015 | Valente et al. |
| 9,079,495 B2 | 7/2015 | Valente et al. |
| 9,157,515 B2 | 10/2015 | Downs et al. |
| 9,249,872 B2 | 2/2016 | Downs et al. |
| 9,249,873 B2 | 2/2016 | Pump et al. |
| 9,254,713 B2 | 2/2016 | Downs et al. |
| 9,302,581 B1 | 4/2016 | Valente |
| 9,346,354 B2 | 5/2016 | Valente |
| 2003/0070501 A1 | 4/2003 | Bell |
| 2003/0186774 A1 | 10/2003 | Sullivan |
| 2005/0101430 A1 | 5/2005 | Ziech |
| 2005/0245342 A1 | 11/2005 | Pontanari et al. |
| 2009/0163313 A1 | 6/2009 | Gassmann et al. |
| 2011/0123264 A1 | 5/2011 | Wang |
| 2013/0303323 A1 | 11/2013 | Zink et al. |
| 2015/0167813 A1 | 6/2015 | Downs et al. |
| 2016/0272003 A1 | 9/2016 | Downs et al. |

FOREIGN PATENT DOCUMENTS

| | | |
|---|---|---|
| DE | 02132412 A1 | 1/1972 |
| DE | 03132443 A1 | 2/1983 |
| DE | 19713211 A1 | 12/1997 |
| DE | 10209166 A1 | 9/2003 |
| DE | 102012206143 A1 | 10/2013 |
| EP | 1348589 A2 | 10/2003 |
| GB | 00881308 A | 11/1961 |
| JP | 60884472 | 5/1985 |
| JP | 06117518 | 4/1994 |
| JP | 2001010304 A | 1/2001 |
| JP | 2011063224 A | 3/2011 |
| WO | WO-2010123964 A1 | 10/2010 |
| WO | WO-14151287 A1 | 9/2014 |

OTHER PUBLICATIONS

Office Action dated Sep. 26, 2014 for U.S. Appl. No. 14/205,535.
SAJAZ_Radlager—Version Jul. 10, 2012.

* cited by examiner

AXLE ASSEMBLY

CROSS-REFERENCE TO RELATED APPLICATIONS

This application claims the benefit of U.S. Provisional Application No. 62/259,679 filed Nov. 25, 2015 and U.S. Provisional Application No. 62/313,212 filed Mar. 25, 2016. The disclosure of each of the above-referenced applications is incorporated by reference as if fully set forth in detail herein.

FIELD

The present disclosure relates to improvements to an axle assembly of the type having an input pinion and a ring gear that are supported for rotation and axial thrust relative to an axle housing via a single bearing that is configured to handle both rotational and thrust loads. The improvements relate to the securing of the input pinion bearing to the axle housing, the provision of a modular axle assembly family having open differential, limited slip differential, locking differential and torque vectoring configurations, and the configuration of the axle housing and clutch in an axle configuration that has a locking differential.

BACKGROUND

Commonly assigned U.S. Pat. Nos. 9,157,515 and 9,028,358 disclose novel axle assemblies that are an improvement over traditional Salisbury and banjo-style axle assemblies for passenger vehicles. While these configurations are relatively new in the art, they are nevertheless susceptible to improvement.

SUMMARY

This section provides a general summary of the disclosure, and is not a comprehensive disclosure of its full scope or all of its features.

In one form, the present teachings provide an axle assembly that includes a housing, an input pinion, a pinion bearing, a retainer plate, a plurality of threaded fasteners, a differential assembly and a ring gear. The housing defines a pinion bearing bore. The pinion bearing is received in the pinion bearing bore and supports the input pinion relative to the housing for rotation about a first axis and for axial thrust in opposite directions along the first axis. The retainer plate is abutted against the single bearing on an end of the single bearing opposite the housing. The threaded fasteners are disposed about a bolt circle and secure the retainer plate to the housing. The threaded fasteners have a centerline and a major diameter. The differential assembly is mounted in the housing for rotation about a second axis that is not parallel to the first axis. The ring gear is meshingly engaged with the input pinion and is coupled to the differential assembly for rotation therewith about the second axis. The centerlines of a first quantity of the threaded fasteners are clustered into a segment. The segment spans less than 180 degrees of the bolt circle and extends radially outward from the first axis beyond the bolt circle by a distance that is less than or equal to five times the major diameter of the threaded fasteners. A second, smaller quantity of the threaded fasteners are not disposed within the segment.

In another form, the present teachings provide an axle assembly that includes an axle housing assembly, an input pinion, a pinion bearing, a ring gear, a ring gear bearing, a differential assembly, a first spindle, a second spindle and a clutch. The axle housing assembly has a carrier housing and first and second end caps that are mounted to the carrier housing. The first end cap cooperates with the carrier housing to define a differential cavity, while the second end cap cooperates with the carrier housing to define a clutch cavity. The input pinion extends into the differential cavity. The pinion bearing supports the input pinion relative to the carrier housing for rotation about a first axis and for axial thrust in opposite directions along the first axis. The ring gear is disposed in the differential cavity and is meshingly engaged to the input pinion. The ring gear bearing supports the ring gear relative to the carrier housing for rotation about a second axis and for axial thrust in opposite directions along the second axis. The second axis is not parallel to the first axis. The differential assembly is received in the differential cavity and is configured to receive rotary power from the ring gear. The differential assembly has first and second differential outputs. The first spindle is drivingly coupled to the first differential output. The second spindle is drivingly coupled to the second differential output. The clutch is received in the clutch cavity and has a first clutch member and a second clutch member. The clutch is configured to selectively transmit rotary power between the first and second clutch members. The first clutch member is coupled for rotation with the first differential output, while the second clutch member is coupled for rotation with the second spindle. The clutch is a multi-plate friction clutch having a plurality of first clutch plates. The first clutch member has a first annular mount portion and a second annular mount portion that is disposed radially outwardly of the first annular mount portion. The first clutch plates are non-rotatably but axially slidably mounted on the second annular mount portion. The carrier housing defines an annular projection that extends axially into the first clutch member radially between the first annular mount portion and the second annular mount portion.

In still another form, the present teachings provide an axle assembly that includes an axle housing assembly, an input pinion, a pinion bearing, a ring gear, a ring gear bearing, a differential assembly, a first spindle, a second spindle and a torque-vectoring mechanism. The axle housing assembly has a carrier housing and first and second end caps that are mounted to the carrier housing. The first end cap cooperates with the carrier housing to define a differential cavity, while the second end cap cooperates with the carrier housing to define a torque-vectoring cavity. The input pinion extends into the differential cavity. The pinion bearing supports the input pinion relative to the carrier housing for rotation about a first axis and for axial thrust in opposite directions along the first axis. The ring gear is disposed in the differential cavity and is meshingly engaged to the input pinion. The ring gear bearing supports the ring gear relative to the carrier housing for rotation about a second axis and for axial thrust in opposite directions along the second axis. The second axis is not parallel to the first axis. The differential assembly is received in the differential cavity and is configured to receive rotary power from the ring gear. The differential assembly has first and second differential outputs. The first spindle is drivingly coupled to the first differential output. The second spindle is drivingly coupled to the second differential output. The torque-vectoring mechanism is received in the torque-vectoring cavity and is configured to operate in a neutral mode, which does not affect the rotary power transmitted to the first and second spindles by the differential assembly, a first torque-vectoring mode, in which rotary power transmitted through the first spindle is reduced relative to the neutral mode, and a second torque-vectoring mode in which rotary power transmitted through second spindle is decreased relative to the neutral mode.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
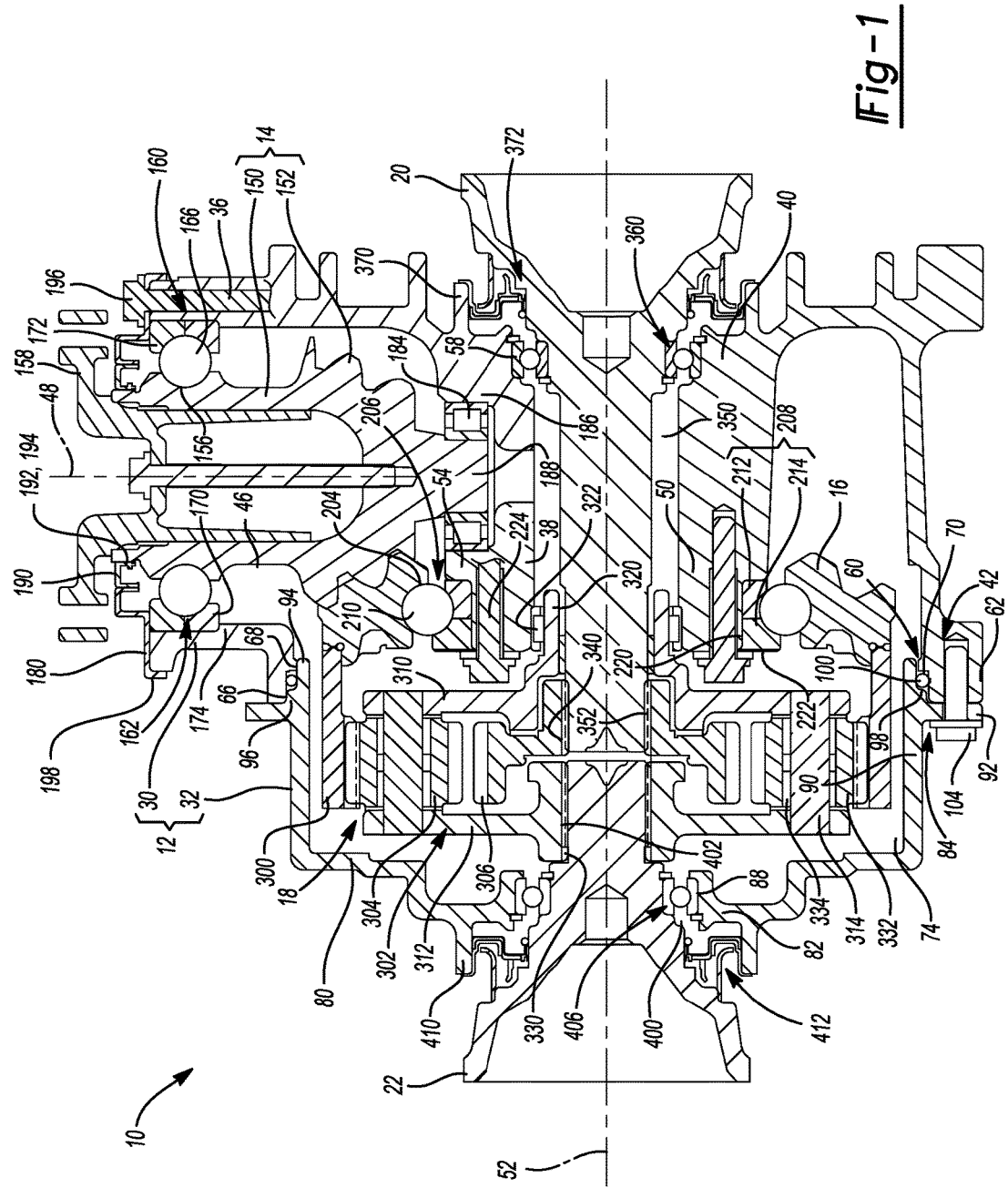
FIGS. 1 through 4 are section views taken through axle assemblies constructed in accordance with the teachings of the present disclosure.

With reference to FIG. 1, a first axle assembly constructed in accordance with the teachings of the present disclosure is generally indicated by reference numeral 10. The axle assembly 10 can include a housing assembly 12, an input pinion 14, a ring gear 16, a differential assembly 18, and first and second axle shafts 20 and 22, respectively.

The housing assembly 12 can include a main housing 30 and a first end cover 32. The main housing 30 can be formed of a suitable material, such as cast iron, steel, aluminum or magnesium. In the example provided, the main housing 30 is formed of aluminum in a die casting process. The main housing 30 can have a wall member 34 that can define a pinion mount 36, a ring gear mount 38, a first axle shaft mount 40 and a first cover mount 42. The pinion mount 36 can define a pinion aperture 46, which is disposed along a first axis 48, and one or more bearing mounts for receiving associated bearings that support the input pinion 14 relative to the main housing 30 for rotation about the first axis 48. The ring gear mount 38 can be constructed as an annular hub 50 that is disposed about a second axis 52 and can define a shoulder 54 that can be disposed on a lateral side of the first axis 48 that is opposite the first axle shaft mount 40. The first axle shaft mount 40 can comprise a bearing bore 58 that can be concentric with the annular hub 50. The first cover mount 42 can define a cover bore 60, which can be formed about the second axis 52 concentric with annular hub 50, and a first cover flange 62 that can extend about the cover bore 60. In the example provided, the cover bore 60 is stepped or counterbored so as to define a first bore portion 66, a second bore portion 68 that can be relatively smaller in diameter than the first bore portion 66, and a first shoulder 70 that can be disposed between the first and second bore portions 66 and 68.

The first end cover 32 can be configured to close the lateral side of the main housing 30 on which the cover bore 60 is disposed and can cooperate with the main housing 30 to form a differential cavity 74. The first end cover 32 can be formed of any suitable material, such as cast iron, steel, aluminum or magnesium. The axle assembly 10 of the particular example provided is configured so that significant thrust loads are not transmitted to or through the first end cover 32 and as such, the first end cover 32 could be formed from a plastic material that may include a structural filler material, such as glass fibers. The first end cover 32 can comprise a wall member 80 that can define a second axle shaft mount 82 and a main housing mount 84. The second axle shaft mount 82 can define a bearing bore 88 that can be concentric with the annular hub 50. The main housing mount 84 can be configured to cooperate with the first cover mount 42 to align the axis of the bearing bore 88 so as to be coincident with the second axis 52 and to facilitate the coupling of the first end cover 32 to the main housing 30. In the example provided, the main housing mount 84 comprises a mounting projection 90 and a second cover flange 92. The mounting projection 90 can extend from the second cover flange 92 in an axial direction along the second axis 52 and can include a first portion 94 and a second portion 96 that can cooperate to define a shoulder 98. The second portion 96 can be larger in diameter than the first portion 94 and can be disposed between the second cover flange 92 and the first portion 94 along the second axis 52. The mounting projection 90 can be received into the cover bore 60 such that the first portion 94 of the mounting projection 90 is received on (and optionally engages in a slip-fit manner) the inside diametrical surface of the second bore portion 68 of the cover bore 60, the second portion 96 of the mounting projection 90 is received on (and optionally engages in a slip-fit manner) the inside diametrical surface of the first bore portion 66 of the cover bore 60, and planar surfaces defined by the first and second cover flanges 62 and 92, respectively, abut one another. An annular seal member 100, such as an O-ring, can be received on the first portion 94 of the mounting projection 90 and sealingly engaged to the inside diametrical surface of the first bore portion 66 of the cover bore 60. Additionally or alternatively, a gasket or sealant material (not shown) can be received between the planar surfaces of the first and second cover flanges 62 and 92 to form a fluid-tight seal between the main housing 30 and the first end cover 32. The first and second cover flanges 62 and 92 can be coupled to one another in any desired manner and may be permanently affixed to one another or releasably coupled to one another. In the example provided, a plurality of threaded fasteners 104 are received through holes formed in the second cover flange 92 and threadably engaged to threaded holes formed in the first cover flange 62 to thereby fixedly but releasably couple the first end cover 32 to the main housing 30.

The input pinion 14 is depicted as a hypoid (spiral bevel) pinion in the example provided such that the first axis is offset from and does not intersect the second axis 52, but it will be appreciated that the input pinion 14 can be any type of bevel pinion. In the particular example provided, the input pinion 14 is constructed in a manner that is described in commonly assigned U.S. Pat. No. 9,103,427, the disclosure of which is hereby incorporated by reference as if fully set forth in detail herein. Briefly, the input pinion 14 is unitarily formed to include a shaft portion 150 and a pinion portion 152. The shaft portion 150 defines an integral bearing race 156 and can be generally hollow to receive therein a portion of a pinion flange 158 that facilitates the coupling of the input pinion 14 to a rotatable shaft, such as a propshaft (not shown). In the example provided, the input pinion 14 is supported for rotation relative to the main housing 30 by a four-point angular contact bearing 160, which is the sole means for transmitting thrust loads between the housing assembly 12 and the input pinion 14. The four-point angular contact bearing 160 can comprise an outer race 162, an inner race (i.e., the integral bearing race 156) and a plurality of bearing balls 166 that can be received on the outer race 162 and the inner race 156. The outer race 162 can comprise a first race member 170 and a second race member 172. The first race member 170 can be received in a first one of the bearing mounts 174 that can be concentric with the pinion bore 46 and abutted against a shoulder formed on the pinion mount 36. The second race member 172 can be received in the pinion bore 46 and can engage the bearing balls 166 on a side of the bearing balls 166 opposite the first race member 170. An annular retainer plate 180 can be received about the input pinion 14 and fixedly coupled to the main housing 30 to secure the second race member 172 in the pinion bore 46 and can apply a preload force to the outer race 162. A second bearing 184, which can be a ball or roller bearing, can be received in a second bearing mount 186 in the main housing 30 and can engage a shaft member 188 that can extend from the pinion portion 152. While the input pinion 14 has been illustrated and described as having an integral bearing race and being supported for rotation relative to the main housing 30 via a four-point angular contact bearing, it will be appreciated that other input pinion configurations could be employed in the alternative and as such, the input pinion 14 could in the alternative be supported by a pair of tapered roller bearings (not shown).

An oil seal 190 can be fixedly mounted to the annular retainer plate 180. In the particular example provided, the oil seal 190 has a seal lip 192 that is formed of PTFE and engages an oil seal surface 194 formed on the input pinion 14. To ensure that the seal lip 192 of the oil seal 190 is positioned on the main housing 30 concentric with the oil seal surface 194, the oil seal 190 can be assembled onto the input pinion 14 and the annular retainer plate 180 can be abutted against the main housing 30 (to permit the oil seal surface 194 to position the oil seal 192 and the annular retainer plate 180 relative to the main housing 30) before a plurality of threaded fasteners 196 are employed to secure the annular retainer plate 180 to the main housing 30. Alternatively, the annular retainer plate 180 could be configured with a locating feature, such as an annular lip 198, that can pilot on a portion of the main housing 30 to thereby position the seal lip 192 concentric with the oil seal surface 194. While the oil seal 190 has been described as having a seal lip 192 that is formed of a PTFE material, it will be appreciated that any type of oil seal could be employed.

Figure 5:
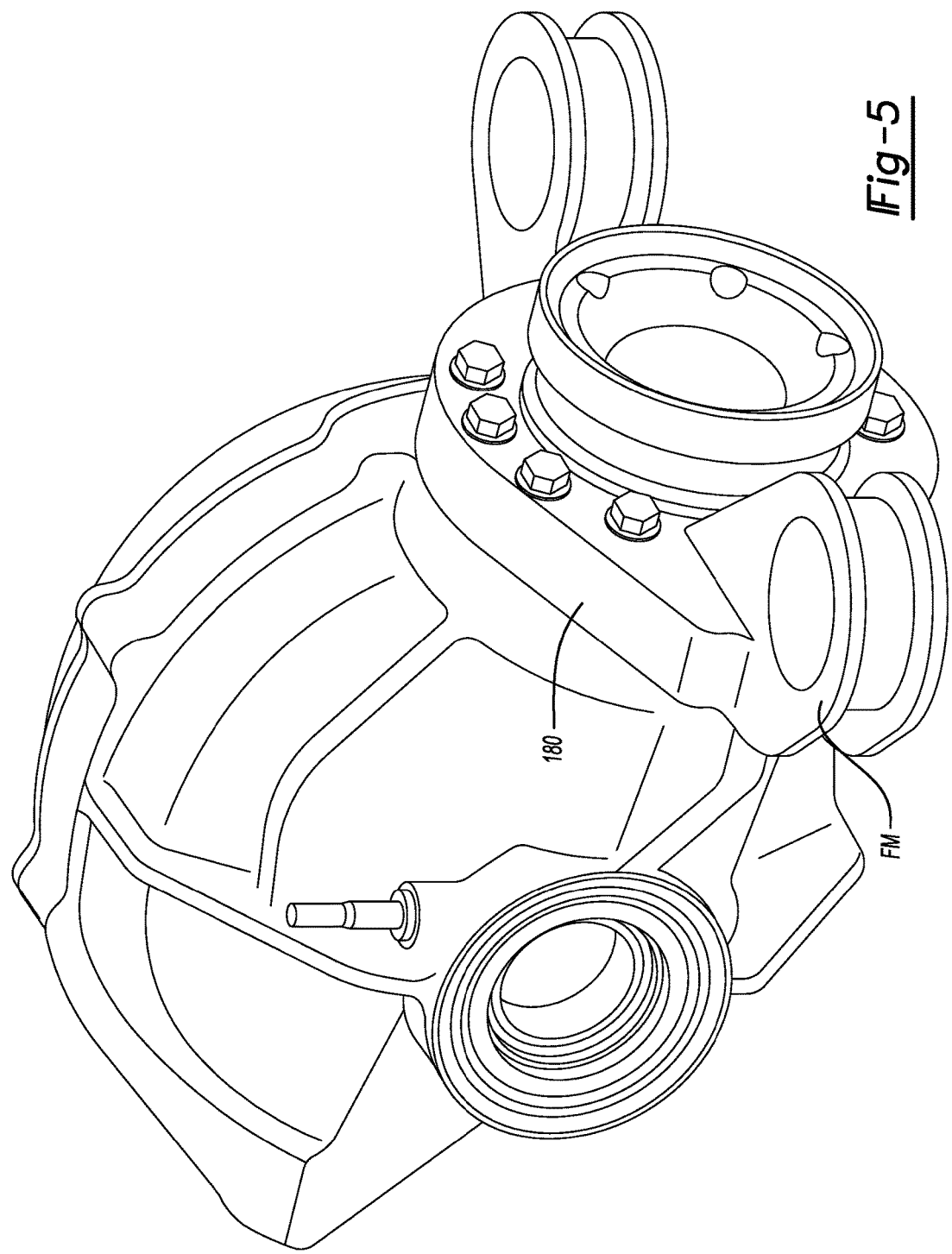
FIG. 5 is a perspective view of another exemplary axle assembly constructed in accordance with the teachings of the present disclosure.
Figure 6:
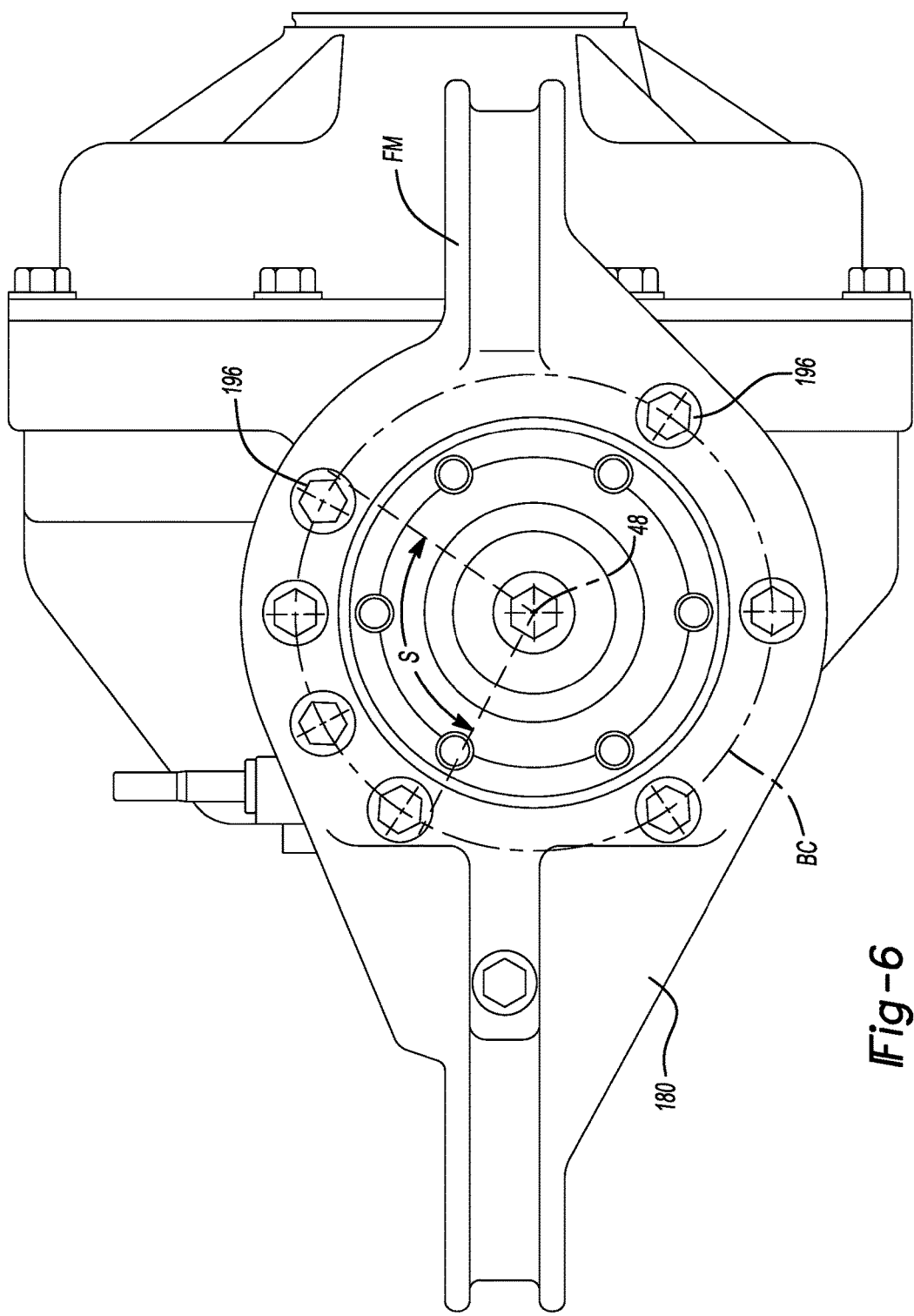
FIG. 6 is a front elevation view of a portion of the axle assembly of FIG. 5.

While the retainer plate 180 has been illustrated as a relatively thin-walled component, it will be appreciated that the retainer plate 180 could be constructed in a more robust manner as shown in FIGS. 5 and 6. Construction in this manner permits the integration of a (front) mount FM with the retainer plate 180.

With specific reference to FIG. 6, the threaded fasteners 196 can be disposed about the first axis 48 in clustered manner that need not be symmetrical. In the example provided, the threaded fasteners 196 are clustered in an area in which the four-point angular contact bearing 160 is relatively highly loaded. The area is a segment S of the bolt circle BC about which the threaded fasteners 196 are disposed. A threaded fastener 196 is considered to be within the segment S if the centerline of the threaded fastener 196 is disposed within the area bounded by segment S or is radially outwardly therefrom by a distance (from the first axis 48) that is less than or equal to five (5) times the major diameter of the threaded fastener 196. The segment S spans less than 180 degrees and preferably less than 120 degrees. In the example shown, the segment S spans less than 90 degrees. Clustering occurs when the segment S can be oriented about the first axis 48 such that the quantity of the threaded fasteners 196 that are disposed within the segment exceeds the quantity of threaded fasteners 196 that are disposed on the bolt circle BC but whose centerlines do not fall within the segment S. In the example shown, clustering of the threaded fasteners 196 occurs because the segment S spans ninety degrees (which is less than 180 degrees) and the segment S can be oriented into the position shown, which places four of the threaded fasteners 196 within the area of the segment S or radially outwardly therefrom by a distance that is less than or equal to five (5) times the major diameter of the threaded fastener 196, while only three of the threaded fasteners 196 lie along the bolt circle BC outside of the segment S. Those of skill in the art will appreciate that the bolt circle BC can be larger in diameter than the pinion flange 158 so as to permit the threaded fasteners 196 to be inserted through the retainer plate 180 and tightened to the main housing 30 after the pinion flange 158 has been coupled to the input pinion 14. Alternatively, the pinion flange 158 could be scalloped to provide clearance for the threaded fasteners 196 and the tooling (e.g., socket wrench) needed to tighten the threaded fasteners 196.

The ring gear 16 can be disposed in the differential cavity 74 in the housing assembly 12 for rotation about the second axis 52 and can be meshingly engaged to the pinion portion 152 of the input pinion 14. In the particular example provided, the ring gear 16 is constructed in a manner that is described in commonly assigned U.S. Pat. No. 9,103,427. Briefly, the ring gear 16 can define an integral bearing race 204 and can be generally hollow to receive therein a portion of the annular hub 50 of the main housing 30. In the example provided, the ring gear 16 is supported for rotation relative to the main housing 30 by a four-point angular contact bearing 206, which is the sole means for transmitting thrust loads between the housing assembly 12 and the ring gear 16. The four-point angular contact bearing 206 can comprise an outer race (i.e., the integral bearing race 204), an inner race 208 and a plurality of bearing balls 210 that can be received on the outer race 204 and the inner race 208. The inner race 208 can comprise a first race member 212 and a second race member 214. The first race member 212 can be received in a third one of the bearing mounts 220 that can be formed on the annular hub 50. The third one of the bearing mounts 220 can define a shoulder against which the first race member 212 can be abutted. The second race member 214 can be received on the annular hub 50 and can engage the bearing balls 210 on a side of the bearing balls 210 opposite the first race member 212. An annular retainer plate 222 can be mounted to an axial end of the annular hub 50 via a plurality of threaded fasteners 224 that extend through holes in the annular retainer plate 222 and are received in threaded holes formed in the main housing 30 to thereby fixedly couple the retainer plate 222 to the main housing 30 and apply a preload force to the inner race 208.

The differential assembly 18 can be any type of mechanism that can transmit rotary power between the ring gear 16 and the first and second axle shafts 20 and 22. In the particular example provided, the differential assembly 18 is an open spur gear differential having an internal gear 300, a planet carrier 302, a plurality of planet gears 304 and a sun gear 306. The internal gear 300 can be sized to overhang the planet gears 304 somewhat on a side opposite the ring gear 16 and can be formed in a process that includes cold-coining the internal teeth of the internal gear 300. The internal gear 300 can be fixedly coupled (e.g., via threaded fasteners or one or more welds) to the ring gear 16. The planet carrier 302 can include a first carrier body 310, a second carrier body 312 and a plurality of carrier pins 314 that extend between the first and second carrier bodies 310 and 312. The first carrier body 310 can include an annular projection 320 that can be received into the annular hub 50 on the main housing 30. A bearing, such as a roller bearing 322 can be received between the annular hub 50 and the annular projection 320 to support the first carrier body 310 for rotation relative to the main housing 30. The second carrier body 312 can have an internally splined or toothed aperture 330. The carrier pins 314 can extend between the first and second carrier bodies 310 and 312. Each of the planet gears 304 can be journally supported on a corresponding one of the carrier pins 314. In the example provided, the planet gears 304 comprise a plurality of planet gear pairs. Each planet gear pair consists of a first planet gear 332, which is meshingly engaged to the teeth of the internal gear 300, and a second planet gear (not specifically shown) that is meshed with the first planet gear 332 and the teeth of the sun gear 306. In the example provided, bearings 334 are disposed between each planet gear 304 and its associated carrier pin 314. The sun gear 306 can define an internally splined or toothed aperture 340.

The first axle shaft 20 can be received through a first axle bore 350 in the main housing 30 that extends concentrically through the annular hub 50. The first axle shaft 20 can include a male splined or toothed segment 352 that can be engaged to the internally splined aperture 340 in the sun gear 306 such that the first axle shaft 20 is non-rotatably coupled to the sun gear 306. A first axle shaft bearing 360 can be received in the bearing bore 58 in the first axle shaft mount 40 and can support the first axle shaft 20 for rotation relative to the main housing 30. In the example provided, the wall member 34 of the main housing 30 defines an annular wall 370 that extends about the second axis 52 concentric with but axially offset from the bearing bore 58. A first axle seal 372 can be received into the annular wall 370 and can sealingly engage the annular wall 370 and the first axle shaft 20.

The second axle shaft 22 can be received in a second axle bore 400 formed in the first end cover 32. The second axle shaft 22 can include a male splined or toothed segment 402 that can be engaged to the internally splined aperture 330 in the second carrier body 312 such that the second axle shaft 22 is non-rotatably coupled to the planet carrier 302. A second axle shaft bearing 406 can be received in the bearing bore 88 in the second axle shaft mount 82 and can support the second axle shaft 22 for rotation relative to the first end cover 32. In the example provided, the wall member 80 of the first end cover 32 defines an annular wall 410 that extends about the second axis 52 concentric with but axially offset from the bearing bore 88. A second axle seal 412 can be received into the annular wall and can sealingly engage the annular wall 410 and the second axle shaft 22.

Figure 2:
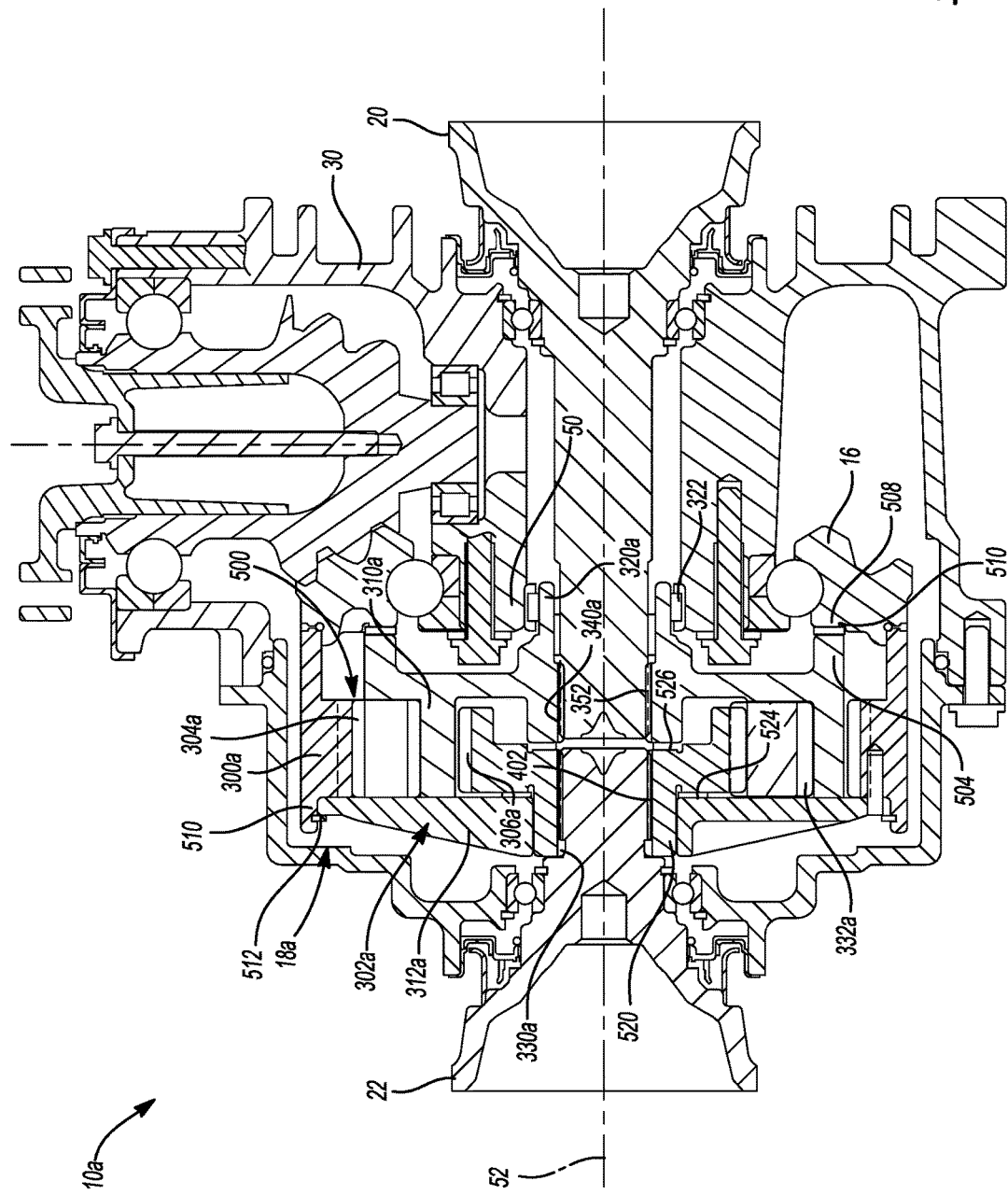

With reference to FIG. 2, a second axle assembly constructed in accordance with the teachings of the present disclosure is generally indicated by reference numeral 10a. The axle assembly 10a is generally similar to the axle assembly 10 (FIG. 1), except that the axle assembly 10a comprises a mechanical limited slip differential assembly 18a having a helical gearset. More specifically, the differential assembly 18a is an open helical gear differential having an internal gear 300a, a planet carrier 302a, a plurality of planet gears 304a and a sun gear 306a. The internal gear 300a can be fixedly coupled (e.g., via threaded fasteners or one or more welds) to the ring gear 16 and comprises internal helical gear teeth. The planet carrier 302a can include a first carrier body 310a and a second carrier body 312a that can be fixedly coupled to the first carrier body 310a. The planet carrier 302a can define a plurality of pinion pockets 500 into which the planet gears 304a can be received. The first carrier body 310a can include an annular projection 320a, which can be received into the annular hub 50 on the main housing 30, an internally splined or toothed aperture 340a, and a first thrust member 504. A bearing, such as a roller bearing 322 can be received between the annular hub 50 and the annular projection 320a to support the first carrier body 310a for rotation relative to the main housing 30. The male splined segment 352 on the first axle shaft 20 can be engaged to the internally splined aperture 340a to thereby non-rotatably couple the first axle shaft 20 to the first carrier body 310a. The first thrust member 504 can be an annular structure that can be disposed proximate a second thrust member 508 formed on the ring gear 16. A first annular thrust washer 510 can be received between the first and second thrust members 504 and 508. The second carrier body 312 can be mounted on an annular projection 510 formed on the internal gear 300a. A retainer, such as an internal snap ring 512, can be employed to limit movement of the second carrier body 312 along the second axis 52 in a direction away from the internal gear 300a.

In the example provided, the planet gears 304a comprise a plurality of planet gear pairs and each of the planet gear pairs is received into a corresponding one of the pinion pockets 500. Each planet gear pair consists of a first planet gear 332a, which is meshingly engaged to the helical teeth of the internal gear 300a, and a second planet gear (not specifically shown) that is meshed with the helical teeth of the first planet gear 332a and the helical teeth of the sun gear 306a. Torque transmission between the first planet gears (332a) and the second planet gears causes the first and second planet gears of each planet gear pair to slide against the internal surfaces of their associated pinion pocket 500. The sun gear 306a can define an internally splined or toothed aperture 330a and an annular projection 520 on which the second carrier body 312a is received. The male splined segment 402 on the second axle shaft 22 can be engaged to the internally splined aperture 330a in the sun gear 306a to thereby non-rotatably couple the sun gear 306a and the second axle shaft 22. A second annular thrust washer 524 can be received between the second carrier body 312a and the sun gear 306a. A third annular thrust washer 526 can be received between the sun gear 306a and the first carrier body 310a.

It will be appreciated that due to the helical configuration of the gearing that makes up the differential assembly 18a, thrust forces will be created during operation of the axle assembly 10a. For example, when rotary power is transmitted from the ring gear 16 to the differential assembly 18a to drive the first and second axle shafts 20 and 22 (i.e., a drive condition), meshing engagement between the second planet gears and the sun gear 306a can generate a thrust force that can be directed from the sun gear 306a toward the first carrier body 310a. The thrust load in the drive condition can be transmitted from the sun gear 306a, through the third annular thrust washer 526, to the first carrier body 310a, through the first annular thrust washer 510 and into the ring gear 16. It will be appreciated that the first and third annular thrust rings 510 and 526 can be configured to provide a first bias ratio. As another example, when rotary power is transmitted from the differential assembly 18a to the ring gear 16

(i.e., a coast condition), meshing engagement between the second planet gears and the sun gear 306a can generate a thrust force that can be directed from the sun gear 306a, through the second annular thrust ring 524, into the second carrier body 312a. It will be appreciated that the second annular thrust ring 524 can be configured to provide a second bias ratio. Various properties of the first and third annular thrust rings 510 and 526, and/or the second annular thrust ring 524 can be selected to vary the first and second bias ratios in a desired manner. Such properties include: the material from which the thrust ring is formed, the configuration and surface area of the thrust ring, the heat-treatment of the thrust ring, coatings and/or platings applied to the thrust ring, and the use of one or more friction materials on the thrust ring or the component(s) in contact with the thrust ring.

Figure 3:
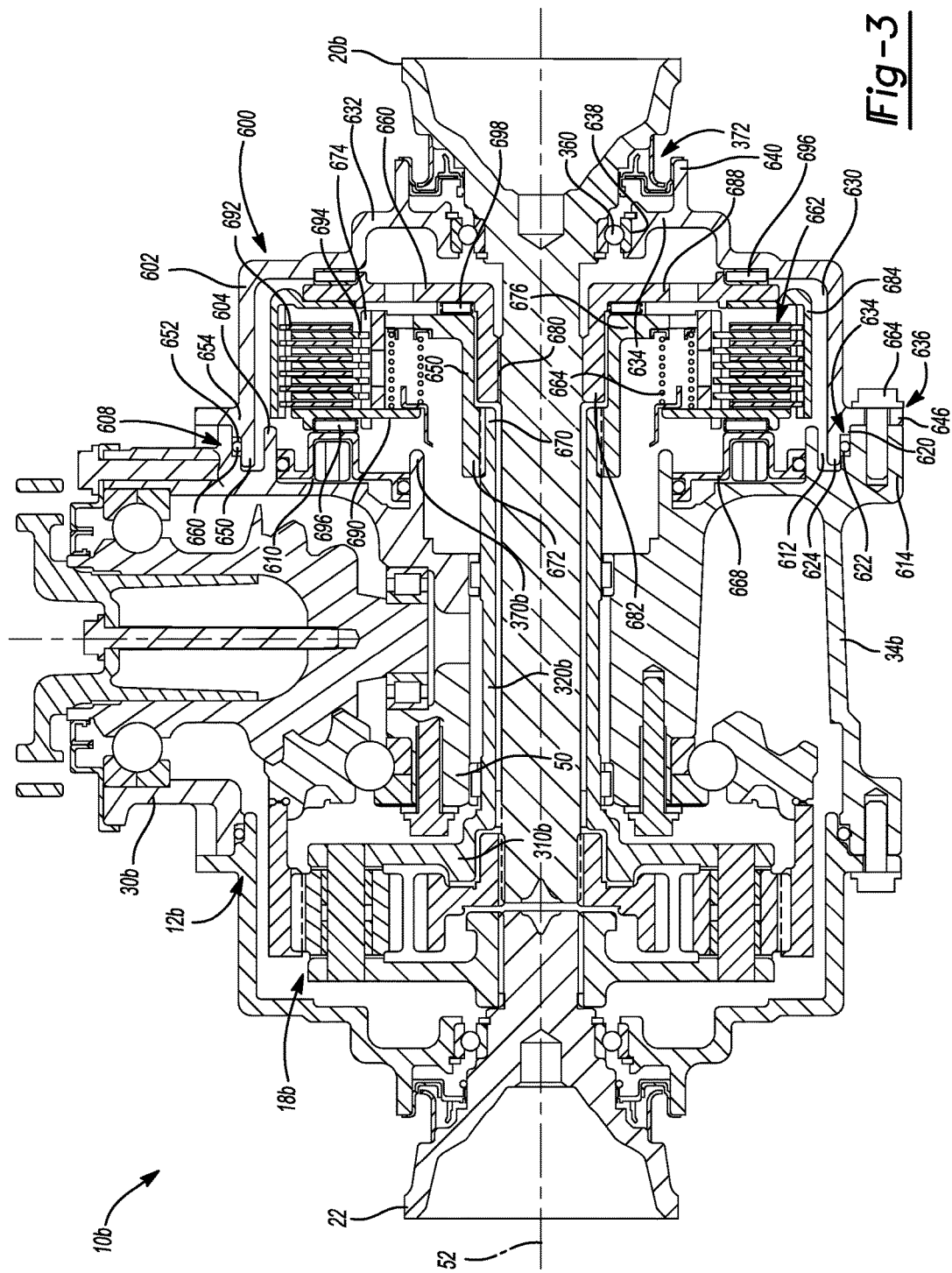

With reference to FIG. 3, a third axle assembly constructed in accordance with the teachings of the present disclosure is generally indicated by reference numeral 10b. The axle assembly 10b is generally similar to the axle assembly 10 (FIG. 1), except that the axle assembly 10b includes a locking clutch 600 and the housing assembly 12b has been modified so as to be capable of housing the locking clutch 600.

The housing assembly 12b is generally similar to the housing assembly 12 (FIG. 1), except that it includes a second end cover 602 and the main housing 30b is modified to receive the second end cover 602. The wall member 34b of the main housing 30b defines the annular wall 370b, a second annular wall 604, and a second cover mount 608. The outer diametrical surface of the annular wall 370b and the inner diametrical surface of the second annular wall 604 can be machined so that they are concentric and cooperate to define a piston cavity 610. The second cover mount 608 can define a cover bore 612, which can be formed about the second axis 52 concentric with annular hub 50, and a third cover flange 614 that can extend about the cover bore 612. In the example provided, the cover bore 612 is stepped or counterbored so as to define a first bore portion 620, a first shoulder 622, and a second bore portion 624 that can be relatively smaller in diameter than the first bore portion 620.

So that the casting that forms the main housing 30b can be common to the main housing 30 (FIG. 1), the casting is formed with the structure that can be machined as needed to form the second annular wall 604 and the second cover mount 608. It will be appreciated that this additional structure need not be machined when the main housing 30 (FIG. 1) is to be formed. Additionally, it will be appreciated that the bearing bore 58 (FIG. 1) in the first axle shaft mount 40 (FIG. 1) and the inside diametrical surface of the annular wall 370b need not be machined when the casting is to be employed to form the main housing 30b.

The second end cover 602 can be configured to cooperate with the main housing 30b to form a clutch cavity 630. The second end cover 602 can be formed of any suitable material, such as cast iron, steel, aluminum or magnesium. The second end cover 602 can comprise a wall member 632 that can define a third axle shaft mount 634 and a main housing mount 636. The third axle shaft mount 634 can define a bearing bore 638, which can be configured to receive the first axle shaft bearing 360 that can support the first axle shaft 20b for rotation relative to the housing assembly 12b, and an annular wall 640 into which the first axle seal 372 can be received. The main housing mount 636 can be configured to cooperate with the cover mount 608 to align the axis of the bearing bore 638 so as to be coincident with the second axis 52 and to facilitate the coupling of the second end cover 602 to the main housing 30b. In the example provided, the main housing mount 636 comprises a mounting projection 634 and a fourth cover flange 646. The mounting projection 634 can extend from the fourth cover flange 646 in an axial direction along the second axis 52 and can include a first portion 650, a shoulder 652 and a second portion 654 that can be separated from the first portion 650 by the shoulder 652. The second portion 654 can be larger in diameter than the first portion 650 and can be disposed between the fourth cover flange 646 and the first portion 650 along the second axis 52. The mounting projection 634 can be received into the cover bore 608 such that the first portion 650 of the mounting projection 634 is received on (and optionally engages in a slip-fit manner) the inside diametrical surface of the second bore portion 624 of the cover bore 612, the second portion 654 of the mounting projection 634 is received on (and optionally engages in a slip-fit manner) the inside diametrical surface of the first bore portion 620 of the cover bore 608, and planar surfaces defined by the third and fourth cover flanges 614 and 646, respectively, abut one another. An annular seal member 660, such as an O-ring, can be received on the first portion 650 of the mounting projection 634 and sealingly engaged to the inside diametrical surface of the second bore portion 620 of the cover bore 608. Additionally or alternatively, a gasket or sealant material (not shown) can be received between the planar surfaces of the third and fourth cover flanges 614 and 646 to form a fluid-tight seal between the main housing 30b and the second end cover 602. The third and fourth cover flanges 614 and 646 can be coupled to one another in any desired manner and may be permanently affixed to one another or releasably coupled to one another. In the example provided, a plurality of threaded fasteners 664 are received through holes formed in the fourth cover flange 646 and threadably engaged to threaded holes formed in the third cover flange 614 to thereby fixedly but releasably couple the second end cover 602 to the main housing 30b.

The locking clutch 600 can be any type of clutch and can be integrated into the axle assembly to selectively inhibit speed differentiation between the first and second axle shafts 20b and 22. In the particular example provided, the locking clutch 600 is a hydraulically-operated multi-plate friction clutch having a first clutch member 650, a second clutch member 660, a clutch pack 662, a clutch spring 664, and a clutch piston 668.

The first clutch member 650 can be coupled to the first carrier body 310b for rotation therewith. For example, the annular projection 320b on the first carrier body 310b can be extended relative to the embodiment of FIG. 1 and can include a male splined or toothed segment 670 that can be engaged by a first annular mount portion 672 of the first clutch member 650. It will be appreciated that while the annular projection 320b is illustrated as being unitarily and integrally formed with the first carrier body 310b, the annular projection 320b and the first carrier body 310b could be formed as discrete components that are fixedly coupled together in a suitable manner, such as by friction welding. The first clutch member 650 can further comprise a second annular mount portion 674, which can be disposed concentrically about the first annular mount portion 672, and a first radially extending portion 676 that can couple the first annular mount portion 672 to the second annular mount portion 674.

The second clutch member 660 can be coupled for rotation with the first axle shaft 20b. In the example provided, the first axle shaft 20b includes a male splined segment 680 that is engaged to a female splined segment formed by a third annular mount portion 682 of the second clutch member 660. The third annular mount portion 682 can be received within the first annular mount portion 672. The second clutch member 660 can further comprise a fourth annular mount portion 684, which can be disposed concentrically about the second and third annular mount portions 674 and 682, and a second radially extending portion 684 that can couple the third annular mount portion 682 to the fourth annular mount portion 684.

The clutch pack 662 can comprise a pressure plate 690, a plurality of first friction plates 692 and a plurality of second friction plates 694. The pressure plate 690 and the second friction plates 694 can be non-rotatably but axially slidably engaged to the second annular mount portion 674. The first friction plates 692 can be non-rotatably but axially slidably engaged to the fourth annular mount portion 684 and interleaved with the second friction plates 694 and optionally the pressure plate 690. The pressure plate 690 can be moved along the second axis 52 between a first position, in which the first and second friction plates 692 and 694 are engaged to one another to permit the transmission of a predetermined amount of rotary power (i.e., torque) between the first and second clutch members 650 and 660, and a second position in which the first and second friction plates 692 and 694 are relatively less engaged to one another. In the second position, the first and second friction plates 692 and 694 could be completely disengaged from one another, or could be merely touching one another, or could be engaged to a lesser degree than the degree to which they are engaged in the first position.

The clutch spring 664 can be configured to bias the pressure plate 690 toward one of the first and second positions. In the example provided, the clutch spring 664 comprises a plurality of helical compression springs that are disposed between the pressure plate 690 and the first radially extending portion 676 and bias the pressure plate 690 toward the second position.

The clutch piston 668 can be received in the piston cavity 610 and can be sealingly but slidingly engaged to the outer diametrical surface of the annular wall 370b and the inner diametrical surface of the second annular wall 604. In the example provided, the clutch piston 668 is depicted as having discrete seals, such as O-ring type seals, that are assembled to the remainder of the clutch piston 668, but it will be appreciated that one or both of the seals could be configured as a lip seal that can be overmolded onto (i.e., cohesively bonded to) the remainder of the clutch piston 668. The piston cavity 610 can be coupled to a source of hydraulic pressure (not shown) that can be selectively applied to the clutch piston 668 to drive the pressure plate 690 into the first position. Axial thrust bearings 696 can be received between the clutch piston 668 and the pressure plate 690, and between the second radially extending portion 684 and the wall member 632 of the second end cover 602. Optionally, an axial thrust bearing 698 can be received between the first and second radially extending portions 676 and 684.

When the locking clutch 600 is not operated (i.e., hydraulic pressure is not applied to the clutch piston 668 so that the clutch spring 664 can move the pressure plate 690 into the second position), the differential assembly 18b operates in the manner of an open differential. When the locking clutch 600 is operated (i.e., hydraulic pressure is applied to the clutch piston 668 so that the pressure plate 690 is moved into the first position), the locking clutch 600 couples the first axle shaft 20b to the first carrier body 310b for common rotation. Since the first carrier body 310b co-rotates with the first carrier body 310 and the second axle shaft 22, operation of the locking clutch 600 causes common rotation of the first and second axle shafts 20b and 22 so that speed differentiation between the first and second axle shafts 20b and 22 is inhibited.

Figure 7:
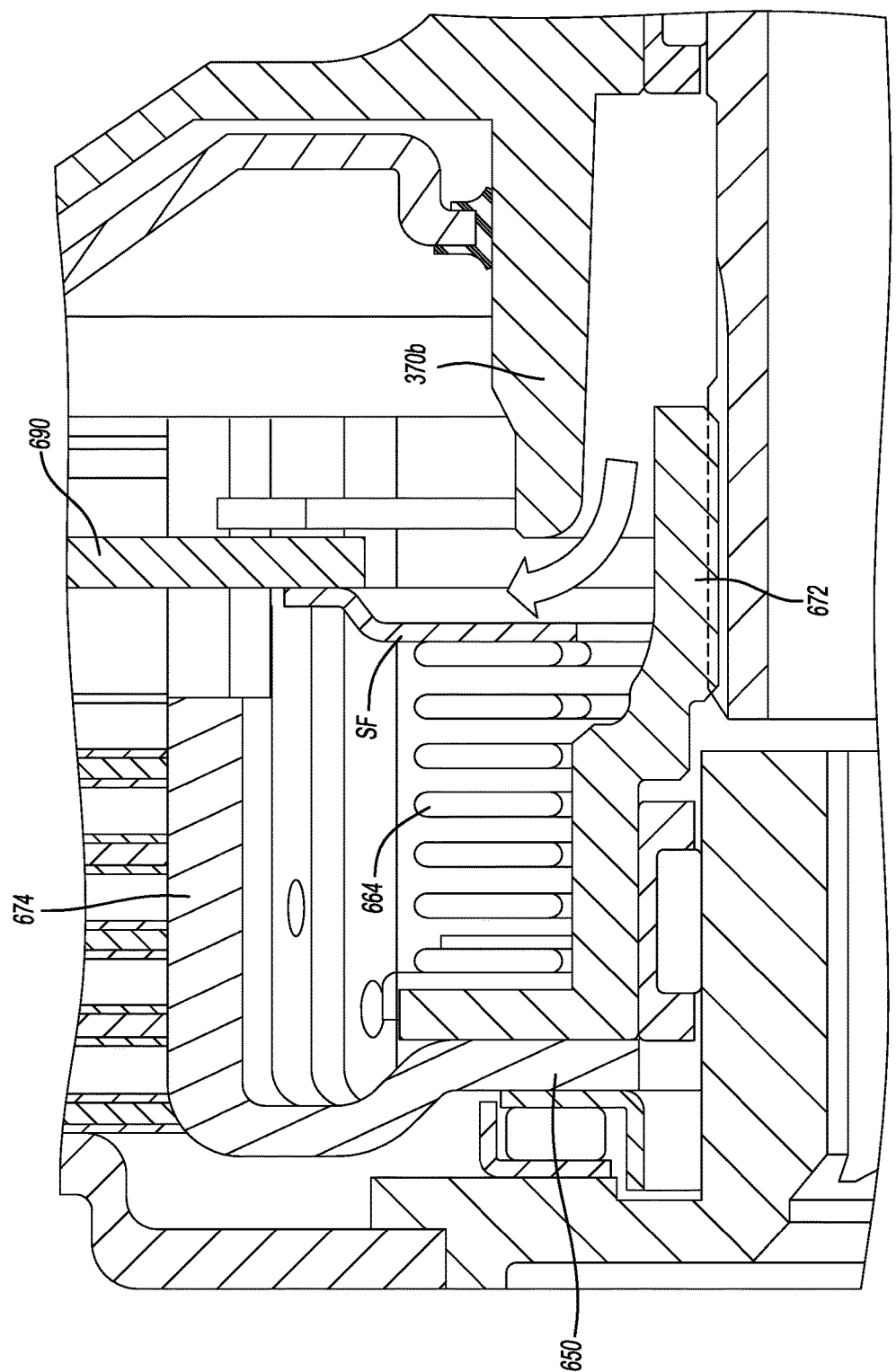
FIG. 7 is a section view of a portion of another exemplary axle assembly constructed in accordance with the teachings of the present disclosure.

With reference to FIG. 7, a portion of an axle assembly similar to that of FIG. 3 is shown. In this example, the pressure plate 690 is depicted as including a spring foot SF that abuts the clutch springs 664. The pressure plate 690 can terminate at its radially inner side axially within the first clutch member 650 and radially between the first and second annular mount portions 672 and 674. Additionally, the annular wall 370b can be somewhat longer than that which was illustrated in the example of FIG. 3 so as to terminate axially within the first clutch member 650 and radially between the first and second annular mount portions 672 and 674. Configuration of the annular wall 370b in this manner aids in directing lubrication into the first clutch member 650.

Figure 4:
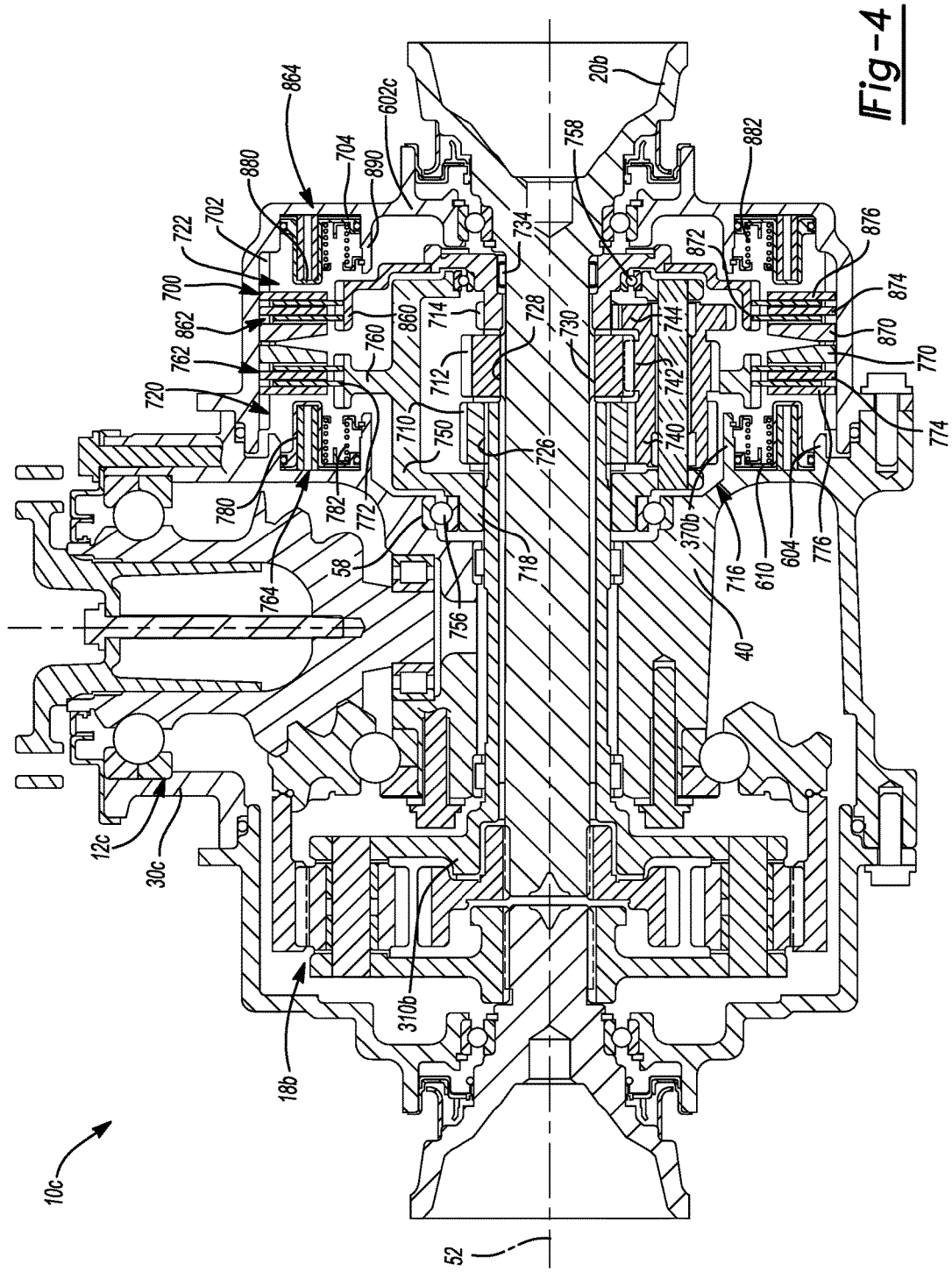

With reference to FIG. 4, a fourth axle assembly constructed in accordance with the teachings of the present disclosure is generally indicated by reference numeral 10c. The axle assembly 10c is generally similar to the axle assembly 10b (FIG. 3), except that the axle assembly 10c includes a torque vectoring mechanism 700 rather than a locking clutch 600 (FIG. 3) and the housing assembly 12c has been modified so as to be capable of housing the torque vectoring mechanism 700.

The housing assembly 12c is generally similar to the housing assembly 12b (FIG. 3), except that it includes a third end cover 602c and the main housing 30c is modified to include the (machined) bearing bore 58 in the first axle shaft mount 40. The third end cover 602c is generally similar to the second end cover 602 (FIG. 3), except that it includes an internally splined or toothed aperture 702 and a second piston cavity 704.

The torque vectoring mechanism 700 can include a first sun gear 710, a second sun gear 712, a third sun gear 714, a plurality of compound planet gears 716, a planet carrier 718, a first torque vectoring clutch 720 and a second torque vectoring clutch 722.

The first sun gear 710 can be fixedly coupled to the first carrier body 310b. In the example provided, the first sun gear 710 has an internally splined aperture 726 that is engaged to the male splined segment on the annular projection 320b of the first carrier body 310b. The second sun gear 712 can be fixedly coupled to the first axle shaft 20b. In the example provided, the second sun gear 712 has an internally splined aperture 728 that is engaged to the male splined segment 730 on the first axle shaft 20b. The third sun gear 714 can be rotatably mounted on the first axle shaft 20b. A bearing 734 can be received between the third sun gear 714 and the first axle shaft 20b.

Each of the compound planet gears 716 comprises a first planet gear 740, a second planet gear 742 and a third planet gear 744 that are coupled to one another for common rotation. The first planet gear 740 is meshed with the first sun gear 710, the second planet gear 742 is meshed with the second sun gear 712, and the third planet gear 744 is meshed with the third sun gear 714.

The planet carrier 718 can include a carrier body 750 and a plurality of carrier pins 752 (only one shown). The carrier body 750 can be supported for rotation relative to the housing assembly 12c by a first bearing 756, which can be received in the bearing bore 58 in the first axle shaft mount 40, and a second bearing 758 that can be disposed between the carrier body 750 and the third sun gear 714. Each of the carrier pins 752 can be mounted to the carrier body 750 and can journally support an associated one of the compound planet gears 716.

The first torque vectoring clutch 720 can be any type of variable force producing clutch, such as a hydraulically operated multi-plate friction clutch having a first inner clutch hub 760, a first clutch pack 762 and a first piston cartridge 764. The first inner clutch hub 760 can be formed on the carrier body 750 and can comprise a toothed or splined hub member. The first clutch pack 762 can comprise a first reaction member 770, a plurality of first clutch plates 772, a plurality of second clutch plates 774 and a pressure plate 776. The first reaction member 770 can be non-rotatably and axially fixed to the splines of the internally splined aperture 702 in the third end cover 602c. The first clutch plates 772 can be axially slidably but non-rotatably coupled to the first inner clutch hub 760. The second clutch plates 774 can be interleaved with the first clutch plates 772 and can be axially slidably but non-rotatably coupled to the internal splines of the internally splined aperture 702 in the third end cover 602c. The pressure plate 776 can be axially slidably but non-rotatably mounted on the internal splines of the internally splined aperture 702. The first piston cartridge 764 can include a first piston 780 and a return spring cartridge 782. The first piston 780 can be received into the piston cavity 610 on the main housing 30c and can be sealingly but slidingly engaged to the outer diametrical surface of the annular wall 370b and the inner diametrical surface of the second annular wall 604. The piston cavity 610 can be coupled to a source of hydraulic pressure (not shown) that can be selectively applied to the first piston 780 to drive the pressure plate 776 toward the first reaction member 770. The return spring cartridge 782 can comprise a plurality of helical compression springs that can be mounted about and secured to the annular wall 370b. The helical compression springs of the return spring cartridge 782 can bias the first piston 780 along the second axis 52 in a direction away from the first reaction member 770.

The second torque vectoring clutch 722 can be any type of variable force producing clutch, such as a hydraulically operated multi-plate friction clutch having a second inner clutch hub 860, a second clutch pack 862 and a second piston cartridge 864. The second inner clutch hub 860 can be coupled to the third sun gear 714 for common rotation and can comprise a toothed or splined hub member. The second clutch pack 862 can comprise a second reaction member 870, a plurality of first clutch plates 872, a plurality of second clutch plates 874 and a second pressure plate 876. The second reaction member 870 can be non-rotatably and axially fixed to the splines of the internally splined aperture 702 in the third end cover 602c. The first clutch plates 872 can be axially slidably but non-rotatably coupled to the second inner clutch hub 860. The second clutch plates 874 can be interleaved with the first clutch plates 872 and can be axially slidably but non-rotatably coupled to the internal splines of the internally splined aperture 702 in the third end cover 602c. The second pressure plate 876 can be axially slidably but non-rotatably mounted on the internal splines of the internally splined aperture 702. The second piston cartridge 864 can include a second piston 880 and a second return spring cartridge 882. The second piston 880 can be received into the second piston cavity 704 in the third end cover 602c and can be sealingly but slidingly engaged to the third end cover 602c. The second piston cavity 704 can be coupled to a source of hydraulic pressure (not shown) that can be selectively applied to the second piston 880 to drive the second pressure plate 876 toward the second reaction member 870. The second return spring cartridge 882 can comprise a plurality of helical compression springs that can be mounted about and secured to an annular wall 890 on the third end cover 602c that defines an inner diametrical surface of the second piston cavity 704. The helical compression springs of the second return spring cartridge 864 can bias the second piston 880 along the second axis 52 in a direction away from the second reaction member 870.

When the torque vectoring mechanism 700 is not operated, hydraulic fluid is not provided to the first piston 780 or to the second piston 880 so that the first and second torque vectoring clutches 720 and 722 do not affect the normal (open) configuration of the differential assembly 18b. In the event that the first and second axle shafts 20b and 22 rotate at different rates, the relative rotation between the first and second sun gears 710 and 712 will cause corresponding rotation of the planet carrier 718 about the second axis 52.

The torque vectoring mechanism 700 can be operated in a first and second torque vectoring modes to transmit additional torque to one of the first and second axle shafts 20b and 22 and reduce the amount of torque that is transmitted to the other one of the first and second axle shafts 20b and 22. Operation of the first torque vectoring clutch 720 (i.e., application of hydraulic pressure to the first piston 780 to drive the first pressure plate 776 toward the first reaction member 770) can slow or halt rotation of the planet carrier 718 about the second axis 52. Due to differences in the pitch diameter between the first and second sun gears 710 and 712, the relatively smaller second sun gear 712 will be rotate relatively faster than the relatively larger first sun gear 710, causing additional torque to be transmitted to the first axle shaft 20b and a corresponding reduction in the amount of torque that is transmitted to the second axle shaft 22. Operation of the second torque vectoring clutch 722 (i.e., application of hydraulic pressure to the second piston 880 to drive the second pressure plate 876 toward the second reaction member 870) can speed up the rotation of the compound planet gear 716 and cause the planet carrier 718 to reverse its rotational direction about the second axis 52. Due to differences in the pitch diameter between the first and second sun gears 710 and 712, the reverse rotation of the planet carrier 718 will have a relatively larger negative effect on the torque that is transmitted to the second sun gear 712 and consequently additional torque to be transmitted to the second axle shaft 22 (via the first planet carrier 718b) and a corresponding reduction in the amount of torque that is transmitted to the first axle shaft 20b.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. An axle assembly comprising:
a housing defining a pinion bearing bore;
an input pinion;
a pinion bearing received in the pinion bearing bore and supporting the input pinion relative to the housing for rotation about a first axis and for axial thrust in opposite directions along the first axis;

a retainer plate abutted against the single bearing on an end of the single bearing opposite the housing;
a plurality of threaded fasteners securing the retainer plate to the housing, the threaded fasteners being disposed about a bolt circle, the threaded fasteners having a centerline and a major diameter;
a differential assembly mounted in the housing for rotation about a second axis that is not parallel to the first axis; and
a ring gear meshingly engaged with the input pinion and coupled to the differential assembly for rotation therewith about the second axis;
wherein the plurality of threaded fasteners are not symmetrically spaced apart by a common spacing, wherein the plurality of threaded fasteners consist of a first quantity of the threaded fasteners and a second quantity of the threaded fasteners, wherein the centerlines of the first quantity of the threaded fasteners are clustered into a segment, the segment spanning less than 180 degrees of the bolt circle and extending radially outward from the first axis beyond the bolt circle by a distance that is less than or equal to five times the major diameter of the threaded fasteners, wherein the second quantity of the threaded fasteners are not disposed within the segment, and wherein the second quantity is less than the first quantity.

2. The axle assembly of claim 1, wherein the segment spans 120 degrees or less of the bolt circle.

3. The axle assembly of claim 2, wherein the segment spans 90 degrees or less of the bolt circle.

4. The axle assembly of claim 1, further comprising an axle mount that is fixedly coupled to the retainer plate.

5. The axle assembly of claim 1, wherein the pinion bearing is a four-point angular contact bearing.

6. An axle assembly comprising:
an axle housing assembly having a carrier housing and first and second end caps that are mounted to the carrier housing, the first end cap cooperating with the carrier housing to define a differential cavity, the second end cap cooperating with the carrier housing to define a clutch cavity;
an input pinion extending into the differential cavity;
a pinion bearing supporting the input pinion relative to the carrier housing for rotation about a first axis and for axial thrust in opposite directions along the first axis;
a ring gear in the differential cavity and meshingly engaged to the input pinion;
a ring gear bearing supporting the ring gear relative to the carrier housing for rotation about a second axis and for axial thrust in opposite directions along the second axis, wherein the second axis is not parallel to the first axis;
a differential assembly received in the differential cavity and configured to receive rotary power from the ring gear, the differential assembly having first and second differential outputs;
a first spindle that is drivingly coupled to the first differential output;
a second spindle that is drivingly coupled to the second differential output; and
a clutch received in the clutch cavity and having a first clutch member and a second clutch member, the clutch being configured to selectively transmit rotary power between the first and second clutch members, the first clutch member being coupled for rotation with the first differential output, the second clutch member being coupled for rotation with the second spindle;
wherein the clutch is a multi-plate friction clutch having a plurality of first clutch plates, wherein the first clutch member has a first annular mount portion and a second annular mount portion that is disposed radially outwardly of the first annular mount portion, wherein the first clutch plates are non-rotatably but axially slidably mounted on the second annular mount portion, and wherein the carrier housing defines an annular projection that extends axially into the first clutch member radially between the first annular mount portion and a radially outer surface of the second annular mount portion.

7. The axle assembly of claim 6, wherein the clutch further comprises a pressure plate having a radially inner end that terminates at a location that is radially between the first annular mount portion and the second annular mount portion.

8. The axle assembly of claim 6, wherein the first differential output comprises a planet carrier.

9. The axle assembly of claim 8, wherein the first differential output further comprises an annular projection that is fixedly coupled to the planet carrier.

10. The axle assembly of claim 9, wherein the annular projection is welded to the planet carrier.

11. An axle assembly comprising:
an axle housing assembly having a carrier housing and first and second end caps that are mounted to the carrier housing, the first end cap cooperating with the carrier housing to define a differential cavity, the second end cap cooperating with the carrier housing to define a torque-vectoring cavity;
an input pinion extending into the differential cavity;
a pinion bearing supporting the input pinion relative to the carrier housing for rotation about a first axis and for axial thrust in opposite directions along the first axis;
a ring gear in the differential cavity and meshingly engaged to the input pinion;
a ring gear bearing supporting the ring gear relative to the carrier housing for rotation about a second axis and for axial thrust in opposite directions along the second axis, wherein the second axis is not parallel to the first axis;
a differential assembly received in the differential cavity and configured to receive rotary power from the ring gear, the differential assembly having first and second differential outputs;
a first spindle that is drivingly coupled to the first differential output;
a second spindle that is drivingly coupled to the second differential output; and
a torque-vectoring mechanism received in the torque-vectoring cavity, the torque-vectoring mechanism being configured to operate in a neutral mode, which does not affect the rotary power transmitted to the first and second spindles by the differential assembly, a first torque-vectoring mode, in which rotary power transmitted through the first spindle is reduced relative to the neutral mode, and a second torque-vectoring mode in which rotary power transmitted through second spindle is decreased relative to the neutral mode.

12. The axle assembly of claim 11, wherein the torque-vectoring mechanism comprises a first friction clutch that variably couples the first differential output to the axle housing assembly to generate a first braking force.

13. The axle assembly of claim 12, wherein the torque-vectoring mechanism comprises a second friction clutch that variably couples the second differential output to the axle housing assembly to generate a second braking force.

* * * * *